US012517598B2

(12) United States Patent
Rizvi et al.

(10) Patent No.: US 12,517,598 B2
(45) Date of Patent: Jan. 6, 2026

(54) INPUT DEVICE

(71) Applicant: Razer (ASIA-PACIFIC) PTE LTD, Singapore (SG)

(72) Inventors: Farrukh Raza Rizvi, Singapore (SG); Chang Sern Gwee, Singapore (SG)

(73) Assignee: Razer (ASIA-PACIFIC) PTE LTD., Singapore (SG)

(*) Notice: Subject to any disclaimer, the term of this patent is extended or adjusted under 35 U.S.C. 154(b) by 0 days.

(21) Appl. No.: 18/864,568

(22) PCT Filed: Jul. 27, 2022

(86) PCT No.: PCT/SG2022/050535
§ 371 (c)(1),
(2) Date: Nov. 11, 2024

(87) PCT Pub. No.: WO2024/025456
PCT Pub. Date: Feb. 1, 2024

(65) Prior Publication Data
US 2025/0335046 A1 Oct. 30, 2025

(51) Int. Cl.
*G06F 3/038* (2013.01)
*G06F 3/0354* (2013.01)

(52) U.S. Cl.
CPC .......... *G06F 3/038* (2013.01); *G06F 3/03543* (2013.01); *G06F 3/03548* (2013.01)

(58) Field of Classification Search
CPC ... G06F 3/038; G06F 3/03543; G06F 3/03548
See application file for complete search history.

(56) References Cited

U.S. PATENT DOCUMENTS 3,608,224 A 9/1971 Hildebrandt
5,585,823 A 12/1996 Duchon et al.
(Continued)

FOREIGN PATENT DOCUMENTS

CN 2916751 Y 6/2007
CN 202166976 U 3/2012
(Continued)

OTHER PUBLICATIONS

International search report; dated Apr. 19, 2023; Application #PCT/SG2022/050535.
(Continued)

*Primary Examiner* — Ariel A Balaoing
(74) *Attorney, Agent, or Firm* — Polsinelli PC

(57) ABSTRACT

In some aspects, an input device may include a switch having an activation element, a button disposed in relative to the switch, and an obstruction member movable between a first position and a second position. The button may be depressible from an undepressed position to a depressed position to engage the activation element when the obstruction member is in the first position, and the button may be blocked from being depressible to the depressed position when the obstruction member is in the second position. The input device may also include a selector operable to cause the obstruction member to move between the first position and the second position and a motion changing arrangement operatively arranged between the selector and the obstruction member to transform a motion of the selector into a motion of the obstruction member for moving the obstruction member between the first position and the second position.

20 Claims, 14 Drawing Sheets

(56) References Cited

U.S. PATENT DOCUMENTS

| | | |
|---|---|---|
| 6,266,047 B1 | 7/2001 | Benja-Athon |
| 6,348,912 B1 | 2/2002 | Smith |
| 7,724,238 B2 | 5/2010 | Daniel et al. |
| 7,746,322 B2 | 6/2010 | Hong et al. |
| 8,717,297 B2 | 5/2014 | Wu |
| 9,203,254 B2 | 12/2015 | Milazzo et al. |
| 9,914,548 B1 | 3/2018 | Vadillo |
| 9,983,694 B2 | 5/2018 | Li |
| 10,048,774 B2 * | 8/2018 | Lai ................ G06F 3/03543 |
| 10,116,157 B2 | 10/2018 | Wang et al. |
| 10,340,099 B2 | 7/2019 | Chen |
| 10,928,933 B1 * | 2/2021 | Chu ................ G06F 3/03543 |
| 10,963,060 B2 * | 3/2021 | Wang ................ G06F 3/016 |
| 2003/0214484 A1 | 11/2003 | Haywood |
| 2007/0046631 A1 | 3/2007 | Chang |
| 2011/0107124 A1 | 5/2011 | Tupman et al. |
| 2011/0271013 A1 * | 11/2011 | Inoue ................ A63F 13/24 |
| | | 710/14 |
| 2011/0279371 A1 * | 11/2011 | Ma ................ G06F 3/03543 |
| | | 345/163 |
| 2013/0073758 A1 | 3/2013 | Chang et al. |
| 2013/0238920 A1 | 9/2013 | Harris |
| 2015/0323979 A1 | 11/2015 | Kaestner |
| 2016/0190794 A1 | 6/2016 | Forghani-Zadeh et al. |
| 2016/0315490 A1 | 10/2016 | Xu et al. |
| 2017/0023993 A1 | 1/2017 | Sultenfuss et al. |
| 2017/0085084 A1 | 3/2017 | Daly |
| 2017/0222450 A1 | 8/2017 | Lee |
| 2018/0120910 A1 | 5/2018 | Farkas et al. |
| 2018/0136705 A1 | 5/2018 | Obie et al. |
| 2019/0146600 A1 * | 5/2019 | Tsai ................ G06F 3/0202 |
| | | 345/163 |
| 2020/0343726 A1 | 10/2020 | Nakamura |
| 2021/0004091 A1 * | 1/2021 | Rizvi ................ G06F 3/03543 |
| 2021/0120639 A1 | 4/2021 | Guatta et al. |
| 2021/0123985 A1 | 4/2021 | Suzuki et al. |
| 2021/0218282 A1 | 7/2021 | Ettes et al. |
| 2022/0155879 A1 * | 5/2022 | Rizvi ................ G06F 3/0312 |
| 2023/0028811 A1 * | 1/2023 | Yu ................ H01H 13/85 |

FOREIGN PATENT DOCUMENTS

| | | |
|---|---|---|
| CN | 102737886 A | 10/2012 |
| CN | 205750741 U | 11/2016 |
| JP | 6-59808 | 3/1994 |
| KR | 10-2015-0096901 A | 8/2014 |
| KR | 10-2022-0003481 A | 1/2022 |
| TW | I498717 B | 9/2015 |
| WO | 95/12159 | 5/1995 |
| WO | 095/12159 A1 | 5/1995 |

OTHER PUBLICATIONS

European Search Report; dated Aug. 6, 2025; application # 22953286.6.

* cited by examiner

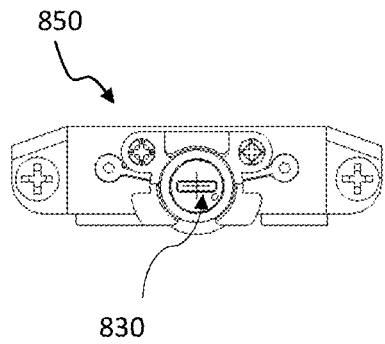
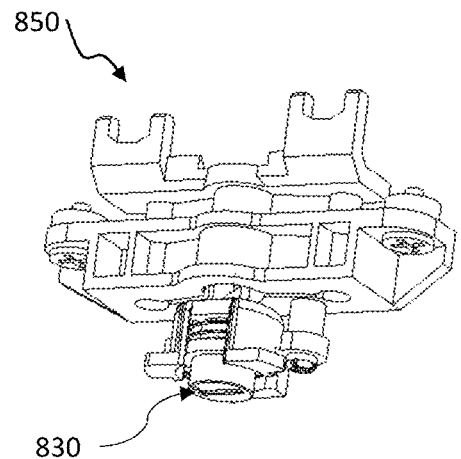
FIG. 10A  FIG. 10B
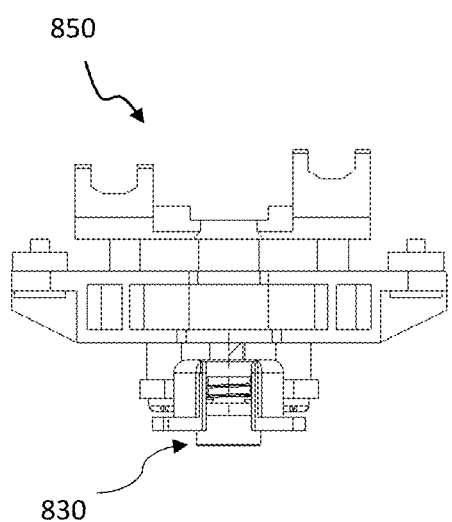
FIG. 10C

INPUT DEVICE

TECHNICAL FIELD

The present disclosure generally relates to an input device, in particular, a user-configurable input device.

BACKGROUND

An input device includes any device used to provide data or control signals to an information processing system such as a computer. Input devices include joysticks, game controllers, keyboards, motion sensing devices or computer mice to receive user input. The input device may be used in various applications and thus need different functions.

Therefore, there exists a need for input devices that are configurable and have improved functionalities.

SUMMARY

According to a first aspect of the present disclosure, an input device is provided. The input device may include a switch having an activation element; a button disposed in relative to the switch; an obstruction member movable between a first position and a second position, wherein the button is depressible from an undepressed position to a depressed position to engage the activation element of the switch when the obstruction member is in the first position, wherein the button is blocked from being depressible to the depressed position when the obstruction member is in the second position, wherein the obstruction member is between the switch and the button when in the second position; a selector operable to cause the obstruction member to move between the first position and the second position; and a motion changing arrangement operatively arranged between the selector and the obstruction member to transform a motion of the selector into a motion of the obstruction member for moving the obstruction member between the first position and the second position.

BRIEF DESCRIPTION OF THE DRAWINGS

FIG. 10A is a diagram showing a bottom view of the components of the example input device of FIG. 8A; FIG. 10B is a diagram showing a perspective view of the components of the example input device as shown in FIG. 10A; FIG. 10C is a diagram showing a front view of the components of the example input device as shown in FIG. 10A.

DETAILED DESCRIPTION

Figure 1:
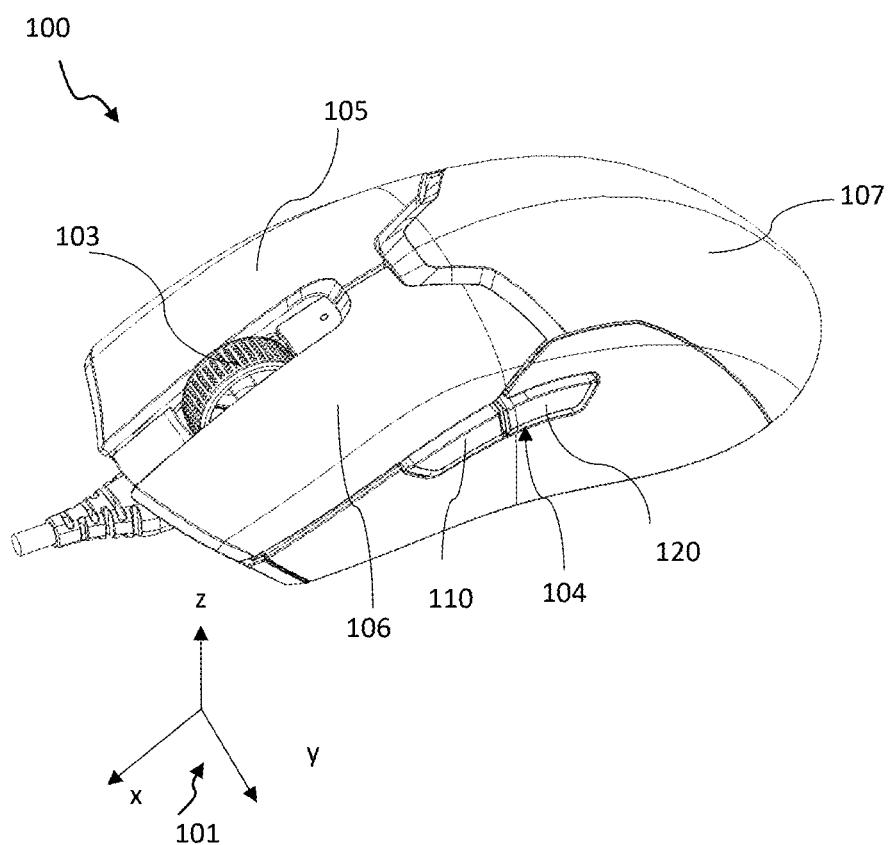
FIG. 1 is a diagram showing a perspective view of an example input device according to an embodiment of the present disclosure.

Implementations described below in the context of a device, apparatus, or system are analogously valid for the respective methods, and vice versa. Furthermore, it will be understood that the implementations described below may be combined, for example, a part of one implementation may be combined with a part of another implementation, and a part of one embodiment may be combined with a part of another embodiment.

It should be understood that the terms "on", "over", "top", "bottom", "down", "side", "back", "left", "right", "front", "back", "lateral", "side", "up", "down", "vertical", "horizontal" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Approximating language, as used herein throughout the specification and claims, may be applied to modify any quantitative representation that could permissibly vary without resulting in a change in the basic function to which it is related. Accordingly, a value modified by a term or terms, such as "about," "substantially", is not limited to the precise value specified but within tolerances that are acceptable for operation of the embodiment for an application for which it is intended. In some instances, the approximating language may correspond to the precision of an instrument for measuring the value.

Various aspects of what is described here seek to provide an input device, particularly, an input device that is configurable or customizable by a user. The input device may include at least one customizable button. The button may be customized to be operable or inoperable in accordance with the user's selection. The input device may include a switch associated with the button, whereby the switch may generate and send a control signal to a processor when depressed. The button may be coupled to the switch in a manner to provide user-access for activating the switch. The input device may be configured to be capable of locking the switch and/or the button so as to prevent the button from activating the switch, as well as unlocking the switch and/or button to provide a free path for the button to activate the switch. According to various aspects, the input device may be provided with an obstruction member (or a stopper) movable between an unlock position (first position) and a lock position (second position). In the lock position, the obstruction member may be disposed between the button and the switch to block or prevent the button from activating the switch. In the unlock position, the obstruction member may be moved away to keep clear of the path of the button such that the button may activate the switch. According to various aspects, the obstruction member may be moved between the lock and unlock position by a toggle slider mechanism, a rotatable knob mechanism, a push button mechanism, or any other suitable mechanism allowing the user to customize the button by operating the mechanism.

According to various aspects, the switch of the input device may have an activation element and the button may be disposed relative to the switch. Further, the button may be configured to activate the switch to generate a signal that may be sent to a processor. The button may be mappable to a special function desirable in one application but not desirable in another application. Accordingly, the user may wish to disable the button when using the input device for the other application. According to various aspects, the input device may include the obstruction member movable between a first position and a second position. The button may be depressible from an undepressed or rest position to a depressed position to engage the activation element of the switch when the obstruction member is in the first position. The button may be blocked from being depressible to the depressed position when the obstruction member is in the second position. The obstruction member may be (directly) between the switch and the button when in the second position and act as a spacer for maintaining a distance apart between the button and the switch (the activation element thereof).

According to various aspects, the input device may further include a selector operable to cause the obstruction member to move between the first position and the second position. The input device may further include a motion changing arrangement operatively arranged between the selector and the obstruction member to transform a motion of the selector into a motion of the obstruction member for moving the obstruction member between the first position and the second position. According to some aspects, the motion of the selector and the motion of the obstruction member may be different directions of motions. Accordingly, the motion changing arrangement may be a direction-changing arrangement. For example, a lateral movement of the selector may be transferred to a vertical movement of the obstruction member. According to some aspects, the motion of the selector and the motion of the obstruction member may be different types of motions. Accordingly, the motion changing arrangement may be a rotary to linear motion converting arrangement. For example, a rotational movement of the selector may be transferred to a linear movement of the obstruction member. Accordingly, the selector may be rotatable by hand (e. g. finger nail) directly or with a customized or standard tool, such as a screw driver, so as to move the obstruction member. According to various aspects, the selector may be accessible from the exterior of the housing of the input device and the user may interact with the selector to make a selection regarding the operable state of the button.

In some aspects of what is described here, when the motion changing arrangement is the direction-changing arrangement, the motion changing arrangement of the input device may include a motion changing element. The selector may include an engagement portion having an engagement surface. The motion changing element may include a corresponding engagement portion having an engagement tip configured to slide along the engagement surface of the engagement portion of the selector. The engagement surface may be inclined with respect to a sliding axis along which the selector is slidable. Accordingly, a sliding movement of the selector along the sliding axis may be transferred to an inclined upward/downward sliding movement of the engagement tip along the inclined engagement surface for moving the obstruction member upward/downward.

In some other aspects of what is described here, when the motion changing arrangement is the rotary to linear motion converting arrangement, an input device may include a selector having an elongate portion fitted through a through-hole at the obstruction member. The elongate portion may include external screw threading and the through-hole may include internal screw threading. Accordingly, the obstruction member may be movable along the elongate portion when the elongate portion is rotated about the rotational axis relative to the obstruction member. Accordingly, a rotational movement of the elongate portion of the selector may be transferred to an upward/downward movement of the obstruction member through the screw threading engagement therebetween.

According to some aspects, the input device may include one button and one obstruction member having one obstruction element. Accordingly, when the obstruction member is in the second position, the obstruction element of the obstruction member may block the button such that the button is non-depressible to activate the corresponding switch. According to some aspects, the input device may include two buttons and one obstruction member having two obstruction elements. Accordingly, when the obstruction member is in the second position, the two obstruction elements of the obstruction member may be placed simultaneously to block the two buttons respectively such that the two buttons are non-depressible to activate the corresponding two switches. According to some aspects, the proposed input device may include two buttons and two obstruction members each having one obstruction element. Accordingly, when one of the two obstruction members is in the second position, the one obstruction element of the one of the two obstruction members may block the corresponding one of the two buttons such that the corresponding button is non-depressible to activate the corresponding switch. In other words, the two obstruction members may be operated individually and selectively. The user may choose to disable any one or both buttons. While the above is described with reference to one or two buttons, it is understood that various aspects is not limited to one or two buttons. The above may be implemented in multiple (or two or more) buttons scenarios in similar manner.

In some instances, aspects of the systems and techniques described here provide technical improvements and advantages over existing approaches. For example, the proposed input device may provide an improved user experience at least for the following reasons. The proposed input device may provide button(s) (e.g. auxiliary button) for which special function(s) may be assigned. The button(s) may be disposed on a side surface of the input device with easy reach of a user. The proposed input device may provide a selector for enabling or disabling the button(s). The selector may be disposed on a bottom surface of the input device such that the user would not accidently alternate the selector. A movement of the selector may be synchronously transferred to a movement of the obstruction member, thereby enabling or disabling the button(s).

The following examples pertain to various aspects of the present disclosure.

Example 1 is an input device including: a switch having an activation element; a button disposed in relative to the switch; an obstruction member movable between a first position and a second position, wherein the button is depressible from an undepressed position to a depressed position to engage the activation element of the switch when the obstruction member is in the first position, wherein the button is blocked from being depressible to the depressed position when the obstruction member is in the second position, wherein the obstruction member is between the switch and the button when in the second position; a selector operable to cause the obstruction member to move between the first position and the second position; and a motion changing arrangement operatively arranged between the selector and the obstruction member to transform a motion of the selector into a motion of the obstruction member for moving the obstruction member between the first position and the second position.

In Example 2, the subject matter of Example 1 may optionally include that the motion of the selector and the motion of the obstruction member are different directions of motions, wherein the motion changing arrangement is a direction-changing arrangement.

In Example 3, the subject matter of Example 2 may optionally include that the selector is slidable along a sliding axis and the obstruction member is movable linearly along a movement axis between the first position and the second position, wherein the sliding axis of the selector and the movement axis of the obstruction member are non-parallel to each other.

In Example 4, the subject matter of Example 3 may optionally include that the motion changing arrangement comprises an engagement portion at the selector in engagement with a corresponding engagement portion at the obstruction member.

In Example 5, the subject matter of Example 4 may optionally include that the engagement portion at the selector comprises an engagement surface inclined with respect to the sliding axis and the corresponding engagement portion at the obstruction member comprises an engagement tip, wherein the engagement tip of the corresponding engagement portion at the obstruction member is in abutment with the engagement surface of the engagement portion at the selector in a manner such that the engagement tip slides along the engagement surface to move the obstruction member along the movement axis when the selector slides along the sliding axis.

In Example 6, the subject matter of Example 5 may optionally include that the engagement tip has a corresponding slanted surface.

In Example 7, the subject matter of Example 5 may optionally include that the corresponding engagement portion at the obstruction member is attached to the obstruction member.

In Example 8, the subject matter of Example 5 may optionally include that the sliding axis of the selector and the movement axis of the obstruction member are perpendicular to each other.

In Example 9, the subject matter of Example 5 may optionally include that the motion changing arrangement comprises a triangular-prism shape structure at the selector with one of the surfaces inclined with respect to the sliding axis to serve as the engagement surface.

In Example 10, the subject matter of any of Examples 1 to 9 may optionally include a guiding member, configured to guide movement of the objection member along the movement axis between the first position and the second position.

In Example 11, the subject matter of any of Examples 1 to 10 may optionally include a biasing member, configured to bias the obstruction member.

In Example 12, the subject matter of any of Examples 1 to 11 may optionally include that the motion of the selector and the motion of the obstruction member are different types of motions, wherein the motion changing arrangement is a rotary to linear motion converting arrangement.

In Example 13, the subject matter of Example 12 may optionally include that the selector is rotatable along a rotational axis and the obstruction member is movable linearly along a movement axis between the first position and the second position, wherein the rotational axis of the selector and the movement axis of the obstruction member are parallel to each other.

In Example 14, the subject matter of Example 13 may optionally include that the motion changing arrangement comprises an elongate portion extending from the selector fitted through a through-hole at the obstruction member, wherein the elongate portion comprises external screw threading and the through-hole comprise internal screw threading, wherein the obstruction member is movable along the elongate portion when the elongate portion is rotated about the rotational axis relative to the obstruction member.

In Example 15, the subject matter of any of Examples 1 to 14 may optionally include a further switch having a further activation element; a further button disposed in relative to the further switch; wherein the further button is depressible from a further undepressed position to a further depressed position to engage the further activation element of the further switch when the obstruction member is in the first position, wherein the further button is blocked from being depressible to the further depressed position when the obstruction member is in the second position, wherein the obstruction member is between the further switch and the further button when in the second position.

In Example 16, the subject matter of Example 15 may optionally include that the obstruction member comprises two portions, a first portion being moved to between the switch and the button when in the second position, and a second portion being moved to between the further switch and the further button when in the second position.

In Example 17, the subject matter of Example 15 may optionally include that the first portion is a mirror image of the second portion.

In Example 18, the subject matter of any of Examples 1 to 17 may optionally include a housing, the housing comprising an aperture, wherein the selector is accessible through the aperture of the housing and operable by a user.

In Example 19, the subject matter of Example 18 may optionally include that the aperture is disposed on a bottom surface of the housing.

In Example 20, the subject matter of Example 18 may optionally include that the housing comprising a further aperture disposed on a side surface of the housing and wherein the button is accessible through the further aperture of the housing and operable by a user.

In Example 21, the subject matter of any of Examples 1 to 20 may optionally include that the switch comprises a mechanical-type switch capable of producing an audible click sound or providing a clicking tactile sensation or both upon being actuated.

In Example 22, the subject matter of any of Examples 1 to 21 may optionally include a processor configured to communicate an output signal to a computer based on activation of the switch when the obstruction member is in the first position.

In Example 23, the subject matter of any of Examples 1 to 22 may optionally include a support component disposed between the obstruction member and the selector, wherein the support component comprises a through-hole for receiving a lower portion of the obstruction member.

Figure 2A:
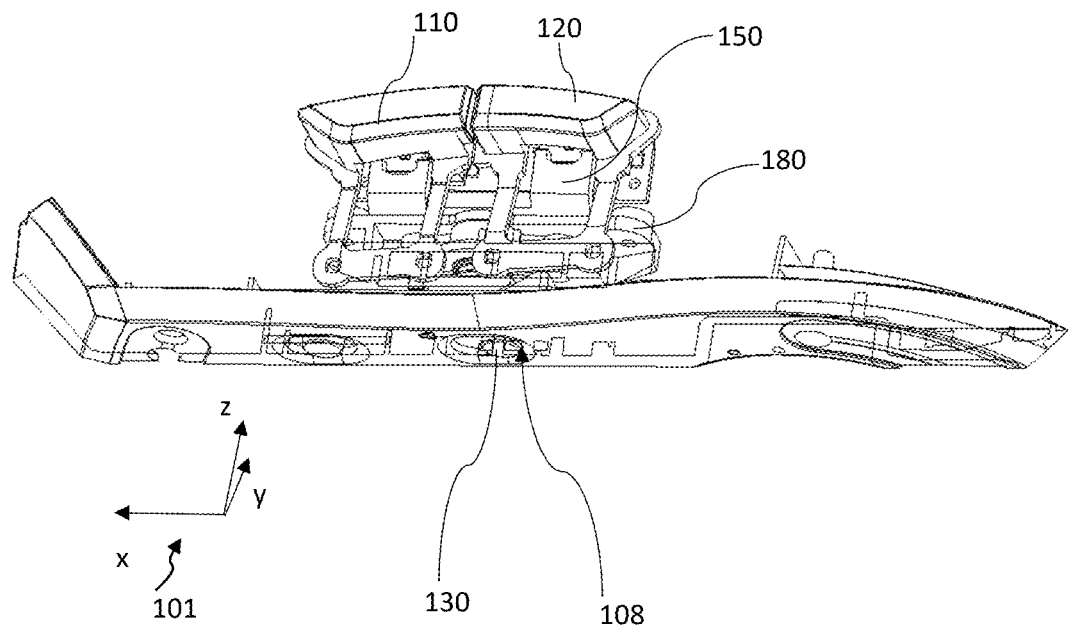
FIG. 2A is a diagram showing a partial perspective view of the example input device of FIG. 1 without part of the housing when the obstruction member is in the first position.
Figure 2B:
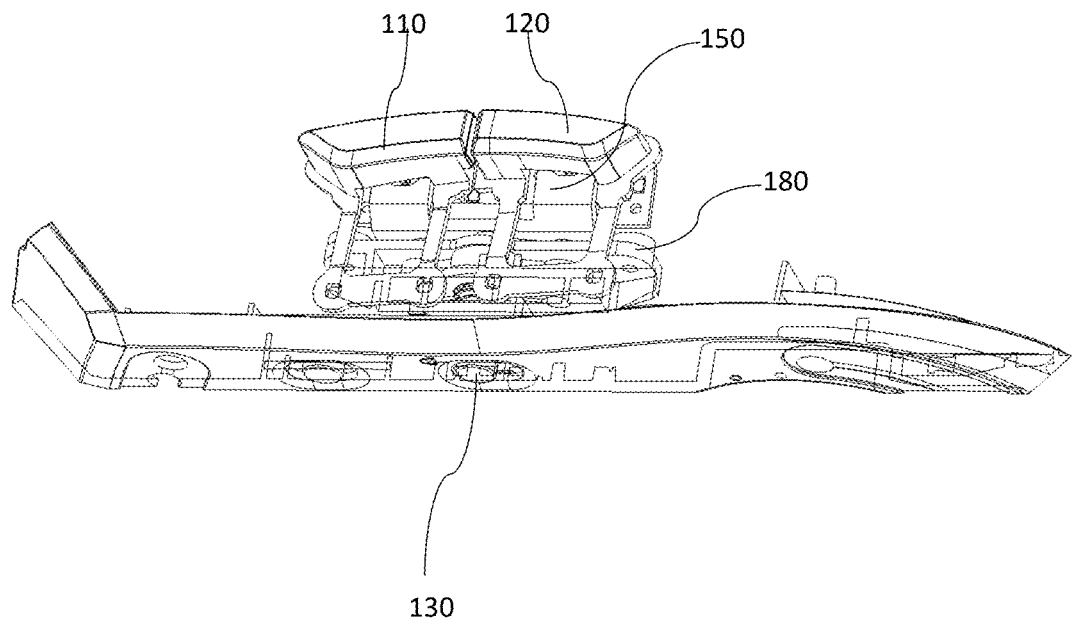
FIG. 2B is a diagram showing a partial perspective view of the example input device of FIG. 1 without part of the housing when the obstruction member is in the second position.

FIG. 1 is a diagram showing a perspective view of an input device 100 according to an embodiment of the present disclosure. FIG. 2A is a diagram showing a partial perspective view of the input device 100 when an obstruction member 150 of the input device 100 is in the first position; FIG. 2B is a diagram showing a partial perspective view of the input device 100 when the obstruction member 150 is in the second position. FIG. 1 and FIGS. 2A and 2B as well as other figures as discussed below also show a frame of reference 101 having three orthogonal axes. The frame of reference 101 includes a first axis in a first direction (e.g., the X-direction), a second axis in a second direction (e.g., the Y-direction), and a third axis in a third direction (e.g., the Z-direction). The first, second, and third directions are perpendicular to each other.

According to various non-limiting embodiments, the input device 100 may include a computer mouse connected to a computer by wire or wirelessly for providing input function. Some features of the input device 100 (e.g. control wheel 103, control buttons 105, 106) that are shown in FIG. 1 are not described in details for purpose of brevity and the input device 100 may include further features not shown in FIG. 1. Input devices to which embodiment apply may have different shapes, different sizes, different numbers and/or placements of controls, and/or other differences from the input device 100 shown in FIG. 1. FIGS. 2A and 2B depict the partial interior of the input device 100 without part of the housing 107.

For example, the input device 100 as shown in FIG. 1 has two auxiliary buttons 110, 120 disposed on one side surface of the input device 100; there may be another two auxiliary buttons disposed on the other side surface of the input device 100 opposing to the side surface where the two auxiliary buttons 110, 120 are disposed, i.e. cannot be seen from FIG. 1. On the other hand, there may be one auxiliary button or no auxiliary buttons disposed on the other side surface of the input device 100. Similarly, there may be one auxiliary button or no auxiliary buttons disposed on this side surface of the input device 100 (i.e. no buttons 110, 120) but one or two auxiliary buttons disposed on the other side surface of the input device 100. Accordingly, it shall not be limited to such number and disposition of the auxiliary buttons as shown in FIG. 1 and include any number of auxiliary buttons, including one or two or three or four and any disposition. The auxiliary buttons may be disposed according to left-handed or right-handed mice. The auxiliary buttons 110, 120 may be disposed in the vicinity of the left control button 106 so that when a user places his right hand on the input device 100 (e.g. a mouse) with his index finger rested on the left control button 106, the auxiliary buttons are within easy reach of his thumb. The following description will be described mainly with reference to the components of the input device 100 disposed on the left side thereof, including the buttons 110, 120, the obstruction member 150 and other associated features as described below, it should appreciated that the components of the input device 100 disposed on the right side thereof including auxiliary button(s), if any, disposed on the other (right) side surface of the input device 100, and other associated features may include the similar features of the buttons 110, 120, the obstruction member 150 and other associated features as described below. Particularly, the components of the input device 100 disposed on the right side thereof may be a mirror image of the components of the input device 100 disposed on the left side thereof.

The housing 107 may be formed by one or more interlocking pieces (e.g., front and back portions). The housing 107 may be made from any suitable material(s), including plastic (e.g., injection molded), metal or combination of metals/alloys, etc. The housing 107 may include an aperture arrangement 104 disposed on a side surface of the housing 107. The buttons 110, 120 may be accessible through the aperture arrangement 104 of the housing 107 and operable by a user. The aperture arrangement 104 may include one aperture where the buttons 110, 120 both protrude from the one aperture; the aperture arrangement 104 may also include two apertures where each of the buttons 110, 120 protrudes from a respective aperture of the two apertures, and the two apertures may be in contact with each other. The housing 107 may include a further aperture 108 disposed on a bottom surface of the housing 107. A selector 130 of the input device 100 may be accessible through the further aperture 108 of the housing 107 and operable by a user. The selector 130 may be disposed on the bottom surface of the input device 100 so that the user would not inadvertently alternate the selector 130.

Figure 6A:
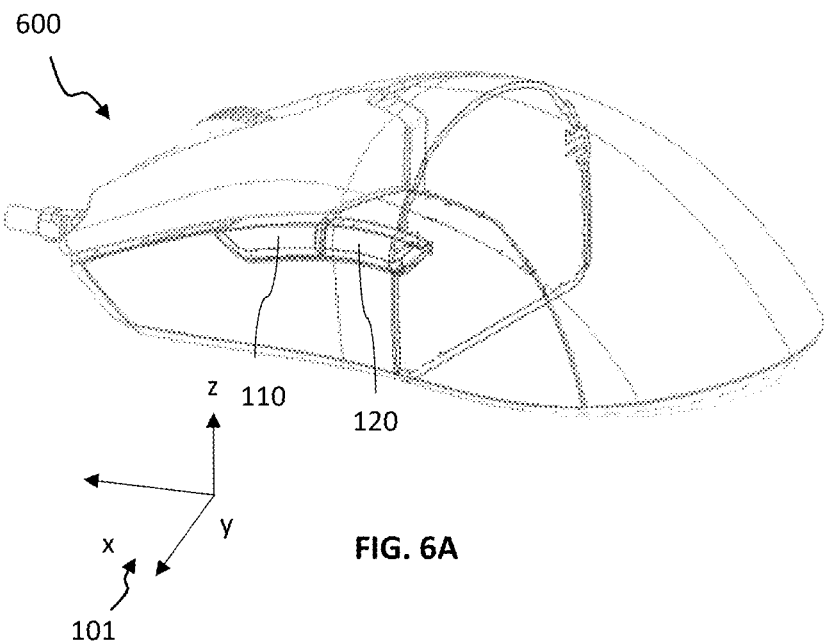
FIG. 6A is a diagram showing a perspective view of the example input device of FIG. 1 with a cross section plane.
Figure 6B:
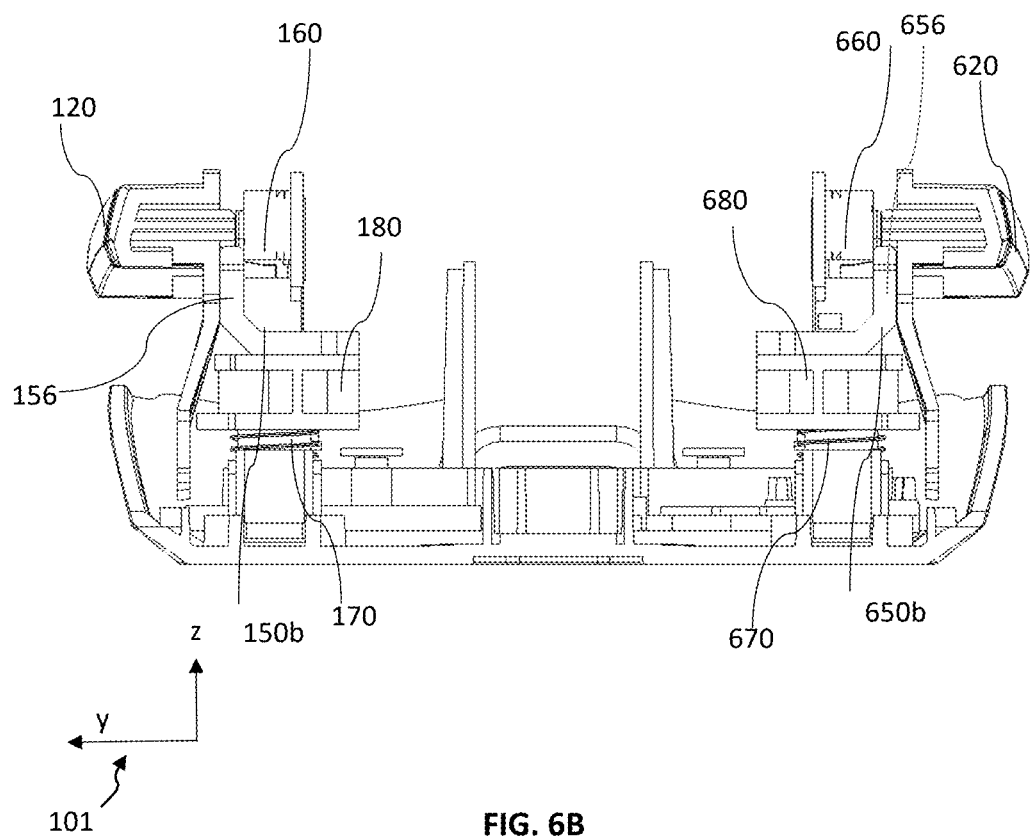
FIG. 6B is a diagram showing a cross section view of the example input device along the cross section plane as shown in FIG. 6A.
Figure 7A:
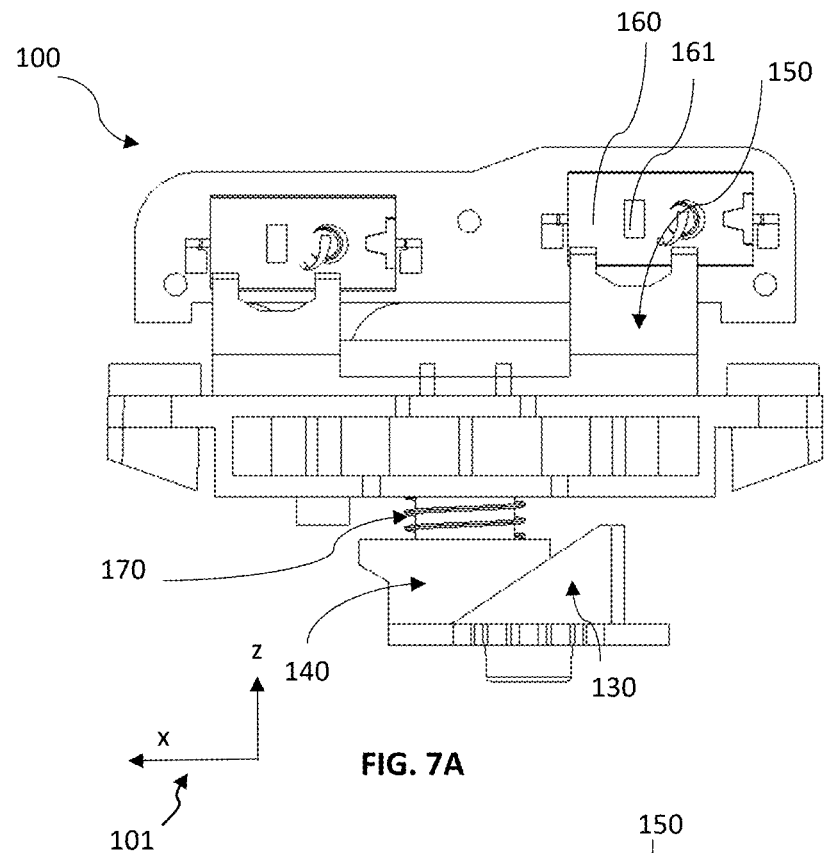
FIG. 7A is a diagram showing a partial front view of the components of the example input device of FIG. 1 when the obstruction member is in the first position.

According to various non-limiting embodiments, the input device 100 may include a switch 160 (as shown in FIG. 6B) having an activation element 161 (as shown in FIG. 7A). The button 120 may be disposed in relative to the switch 160. The obstruction member 150 may be movable between a first position as shown in FIG. 2A and a second position as shown in FIG. 2B. The button 120 may be depressible from an undepressed position to a depressed position to engage the activation element of the switch 160 when the obstruction member 150 is in the first position. Accordingly, when the obstruction member 150 is in the first position, the button 120 may be depressible to activate the relevant functionality that it is assigned. The button 120 may be blocked from being depressible to the depressed position when the obstruction member 150 is in the second position, wherein the obstruction member 150 may be between the switch 160 and the button 120 when in the second position. Accordingly, when the obstruction member 150 is in the second position, the button 120 may be disabled to activate the relevant functionality that it is assigned as the button 120 is blocked by the obstruction member 150. In some embodiments, the obstruction member 150 may be directly between the switch 160 and the button 120 when in the second position so as to act as a spacer therebetween.

According to various non-limiting embodiments, the input device 100 may also include the selector 130 operable to cause the obstruction member 150 to move between the first position and the second position. The selector 130 may be actuated by a user from the exterior of the housing 107 (e.g through the aperture 108), for example, including but not limited to, moving a lever, a pin, a post, a slider, a knob, etc., touching a capacitive or other touch-sensitive switch, applying pressure to a squeeze switch, etc. The input device 100 may further include a motion changing arrangement (for example 109 in FIG. 5B) operatively arranged between the selector 130 and the obstruction member 150. The motion changing arrangement may transform a motion of the selector 130 into a motion of the obstruction member 150 for moving the obstruction member 150 between the first position and the second position. In some embodiments, the motion changing arrangement may transform a change of state of the selector 130 into a motion of the obstruction member 150 for moving the obstruction member 150 between the first position and the second position. A change of state of the selector 130 may include a change from a first state to a second state without involving any motion. The input device 100 may include a support component 180. The support component 180 may be provided to aid the movement of the obstruction member 150 from the first position to the second position.

According to various non-limiting embodiments, the motion of the selector 130 and the motion of the obstruction member 150 may be different directions of motions. Accordingly, the motion changing arrangement may be a direction-changing arrangement (for example 109 in FIG. 5B). For example, the selector 130 may be slidable along a sliding axis 501 (e.g. in the X-direction) and the obstruction member 150 may be movable linearly along a movement axis 502 (e.g. in the Z-direction) between the first position and the second position. The sliding axis of the selector 130 and the movement axis of the obstruction member 150 may be non-parallel to each other. That is, the sliding axis of the selector 130 and the movement axis of the obstruction member 150 may form an angle having a non-zero degree. Particularly, the sliding axis of the selector 130 and the movement axis of the obstruction member 150 may be perpendicular to each other. Alternatively or additionally, the sliding axis of the selector 130 and the movement axis of the obstruction member 150 may form an acute angle.

The selector 130, the motion changing arrangement 109, the obstruction member 150 and the support component 180 will be further described with reference to FIGS. 3, 3A to 3D, FIGS. 4A and 4B, and FIGS. 5A and 5B.

Figure 3:
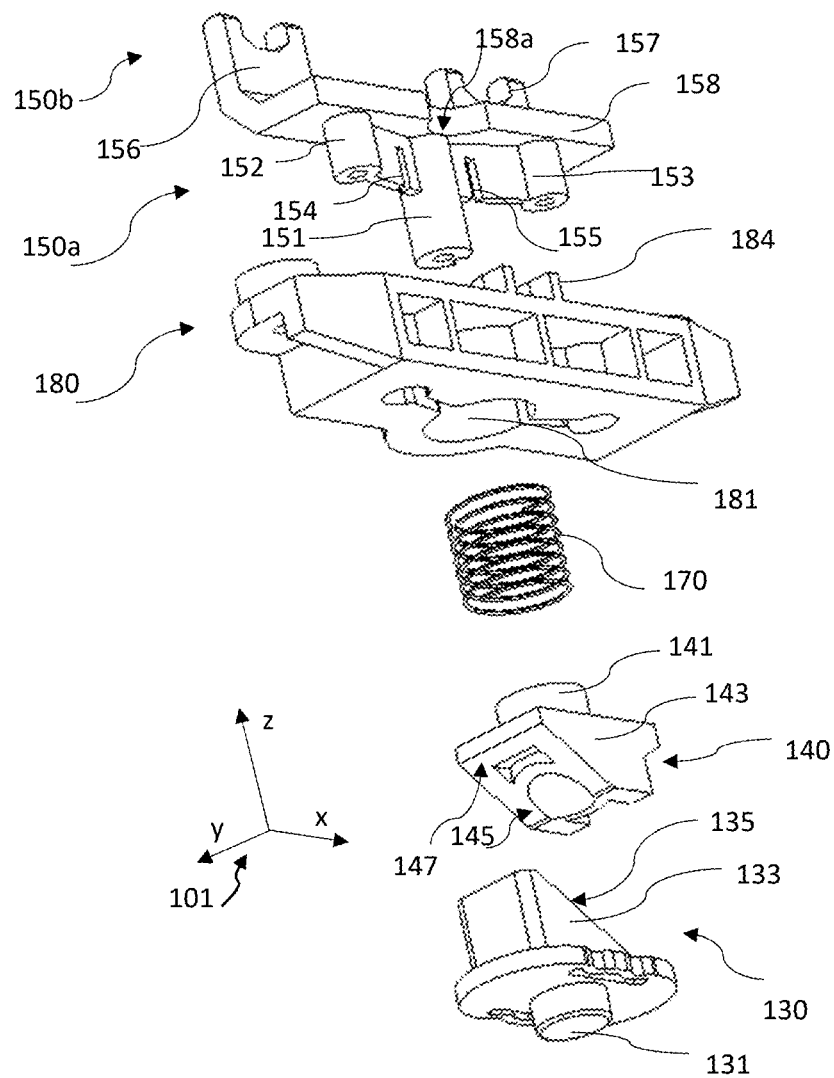
FIG. 3 is a diagram showing an exploded view of the components of the example input device of FIG. 1.
Figure 3A:
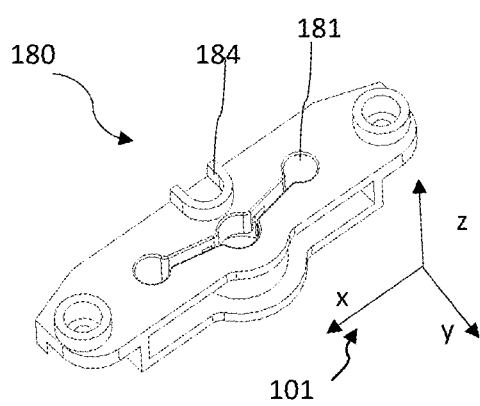
FIG. 3A is a diagram showing one component of the example input device of FIG. 1.
Figure 3B:
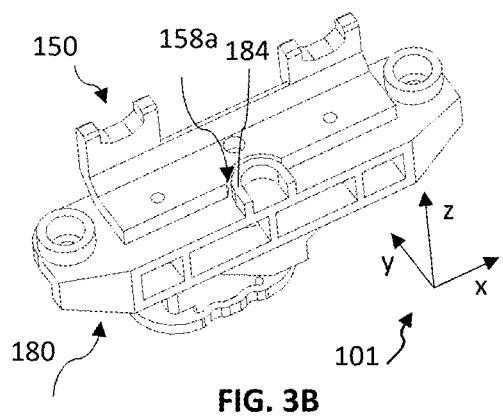
FIG. 3B is a diagram showing two components of the example input device of FIG. 1.
Figure 3C:
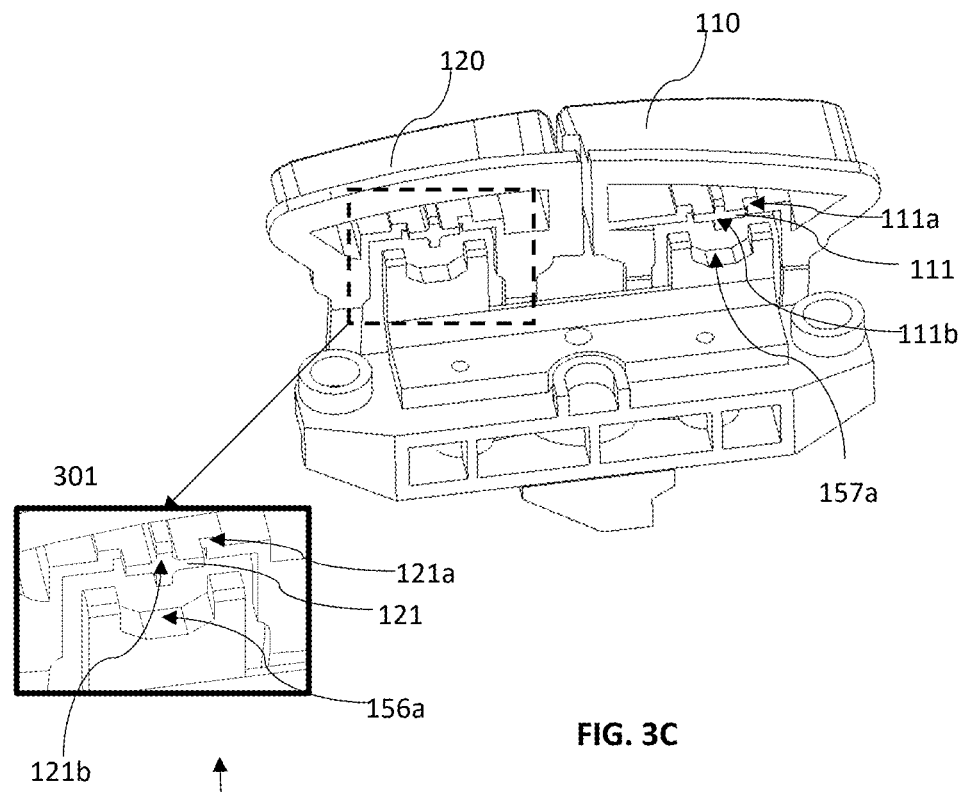
FIG. 3C is a diagram showing some components of the example input device of FIG. 1 when the obstruction member is in the first position.
Figure 3D:
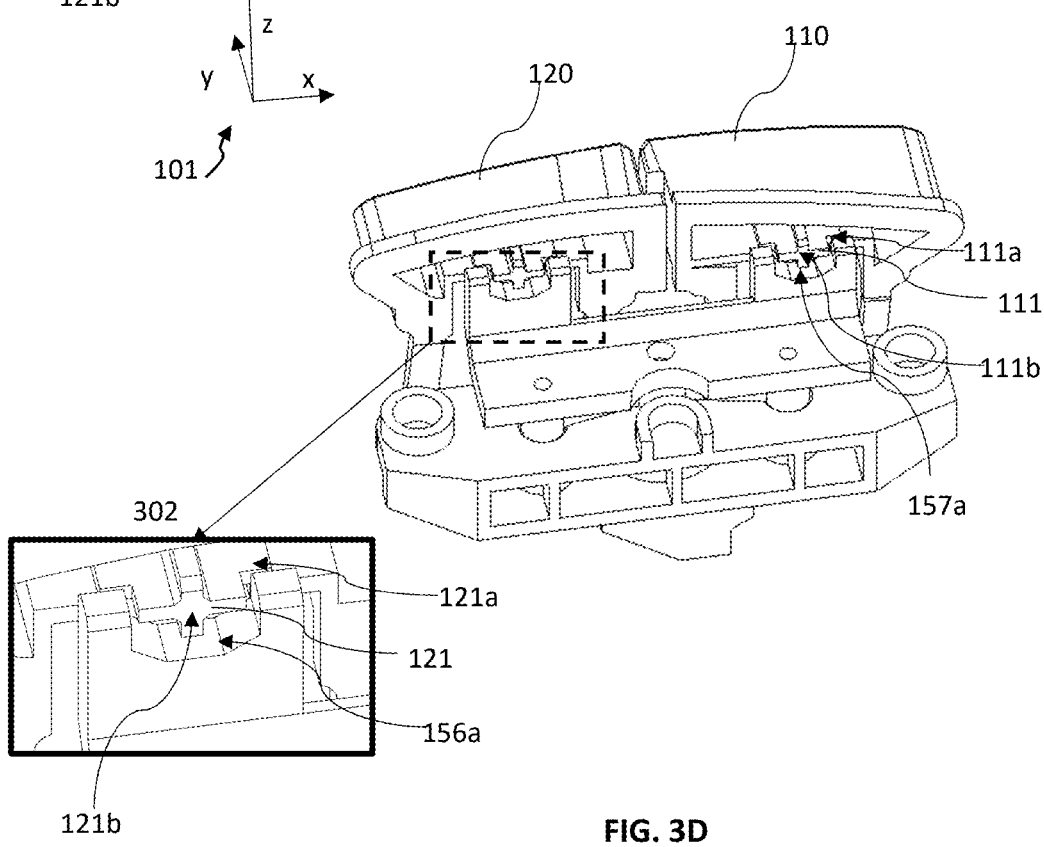
FIG. 3D is a diagram showing some components of the example input device of FIG. 1 when the obstruction member is in the second position.
Figure 4A:
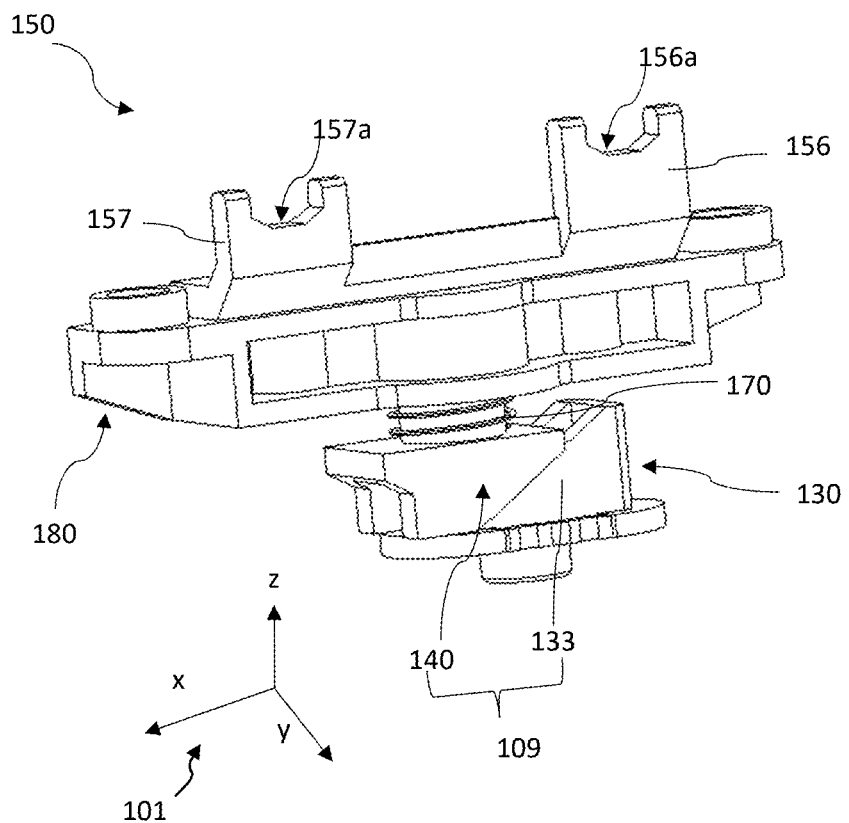
FIG. 4A is a diagram showing a perspective view of the components of the example input device as shown in FIG. 3, partially assembled.
Figure 4B:
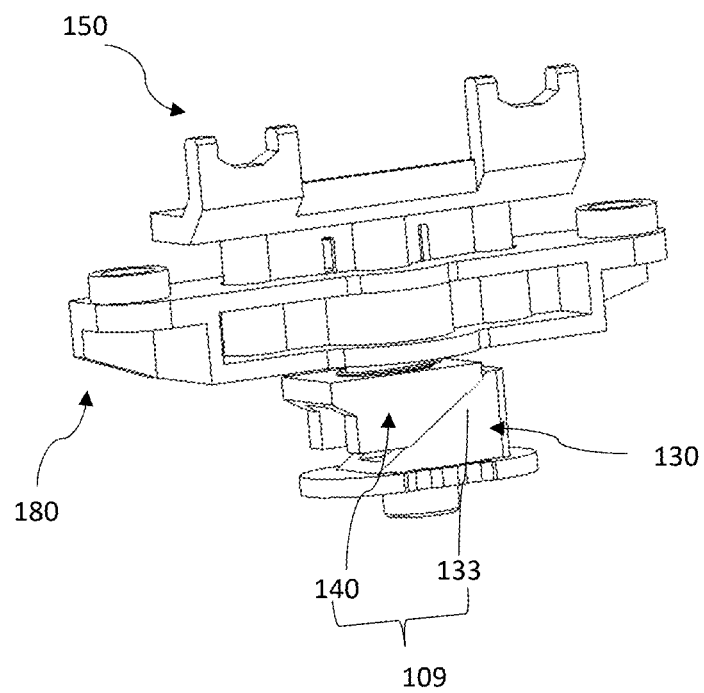
FIG. 4B is a diagram showing a perspective view of the components of the example input device as shown in FIG. 3, assembled.
Figure 5A:
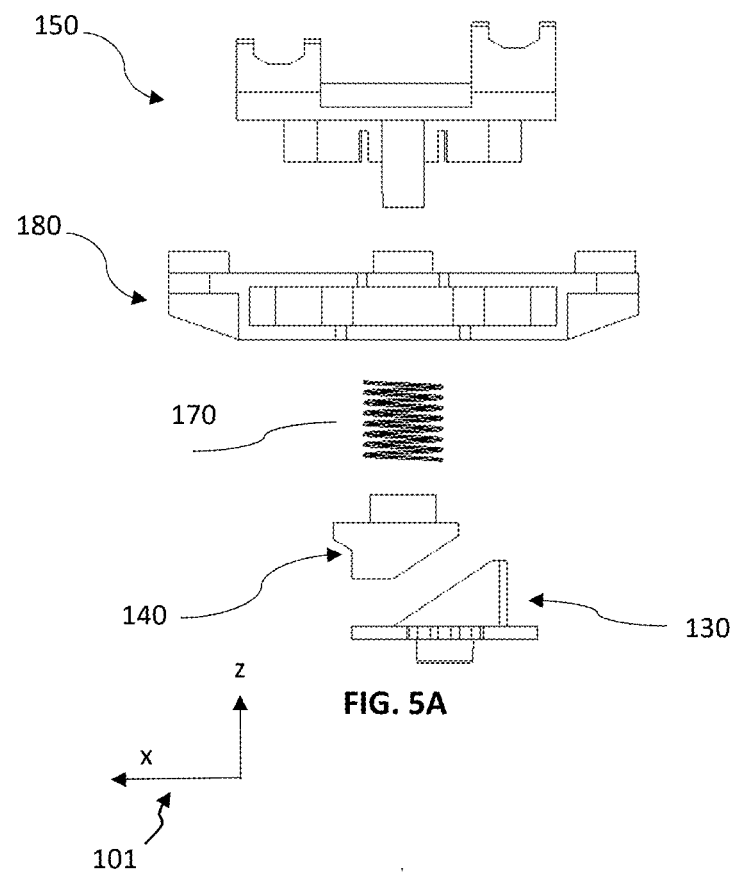
FIG. 5A is a diagram showing an exploded front view of the components of the example input device as shown in FIG. 3.
Figure 5B:
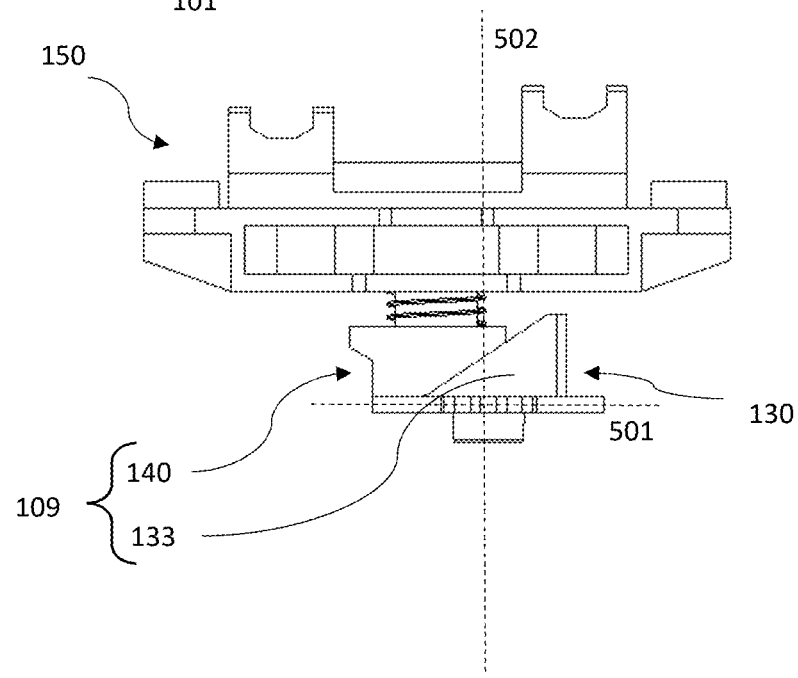
FIG. 5B is a diagram showing a front view of the components of the example input device as shown in FIG. 3, assembled.

FIG. 3 is a diagram showing an exploded view of the selector 130, the motion changing arrangement 109, the obstruction member 150, the support component 180, a biasing member 170 of the input device 100; FIG. 3A is a diagram showing the support component 180 of the input device 100; FIG. 3B is a diagram showing the support component 180 engaged with the obstruction member 150 of the input device 100; FIG. 3C is a diagram showing the buttons 110, 120, the obstruction member 150, the support component 180 of the input device 100 when the obstruction member 150 is in the first position; FIG. 3D is a diagram showing the buttons 110, 120, the obstruction member 150, the support component 180 of the input device 100 when the obstruction member 150 is in the second position. FIG. 4A is a diagram showing a perspective view of the selector 130, the motion changing arrangement 109, the obstruction member 150, the support component 180, the biasing member 170 of the input device 100, partially assembled; FIG. 4B is a diagram showing a perspective view of the selector 130, the motion changing arrangement 109, the obstruction member 150, the support component 180, the biasing member 170 of the input device 100, assembled. FIG. 5A is a diagram showing an exploded front view of the selector 130, the motion changing arrangement 109, the obstruction member 150, the support component 180, the biasing member 170 of the input device 100; FIG. 5B is a diagram showing a front view of the selector 130, the motion changing arrangement 109, the obstruction member 150, the support component 180, the biasing member 170 of the input device 100, assembled.

According to various non-limiting embodiments, the motion changing arrangement 109 may include the engagement portion 133 of the selector 130 and a motion changing element 140. The selector 130 may include a knob 131 accessible to a user for alternating between a first state and a second state of the selector 130 along the sliding axis. The selector 130 may further include an engagement portion 133. The engagement portion 133 may include a triangular-prism shape structure with one of the surfaces inclined with respect to the sliding axis 501 to serve as an engagement surface 135. The engagement portion 133 may be integral or attached to the selector 130. Accordingly, when the user alternates the selector 130 from the first state to the second state, the obstruction member 150 may be caused to move between the first position and the second position.

The motion changing element 140 may include a borehole structure 141 for receiving a shaft structure 151 of the obstruction member 150. Accordingly, the obstruction member 150 may be coupled to the motion changing element 140 through the engagement of the borehole structure 141 and the shaft structure 151. Hence, the shaft structure 151 of the obstruction member 150 may be inserted into the borehole structure 141 of the motion changing element 140. The motion changing element 140 may also include a corresponding engagement portion 143 for engaging with the engagement portion 133 of the selector 130. The corresponding engagement portion 143 of the motion changing element 140 may include an engagement tip 145. The engagement tip 145 of the corresponding engagement portion 143 may be in abutment with the engagement surface 135 of the engagement portion 133 of the selector 130. In this manner, when the selector 130 slides along the sliding axis 501, the engagement tip 145 may slide along the engagement surface 135 between a lower position and an upper position and consequently move the obstruction member 150 upward/downward along the movement axis. Accordingly, a movement of the selector 130 may be transferred from the engagement portion 133 of the selector 130 to the motion changing element 140 for moving the obstruction member 150 in a synchronous manner. In some embodiments, the engagement tip 145 may include a corresponding slanted surface 147. The slanted surface 147 may be parallel to the engagement surface 135 so as to slide along the engagement surface 135.

According to various non-limiting embodiments, the obstruction member 150 may include a lower portion 150a and an upper portion 150b. The lower portion 150a and the upper portion 150b may be integral to each other or attached to each other. The lower portion 150a may include the shaft structure 151 disposed in a middle region of the lower portion 150a and two wing structures extending from opposite sides of the shaft structure 151. Each of the two wing structures may include a guiding element (152, 153) disposed on a distal end of the respective wing structure. The guiding elements 152, 153 may include shaft-shaped structures parallel to the shaft structure 151 along the longitudinal directions (i.e. in the Z-direction). Each of the two wing structures may further include a slot (154, 155) disposed between the shaft structure 151 and the respective guiding element (152, 153). The slots 154, 155 may be parallel to the shaft structure 151, the guiding elements 152, 153 along the longitudinal directions. The biasing member 170 may be disposed around the shaft structure 151 of the obstruction member 150.

The upper portion 150b of the obstruction member 150 may include a base structure 158. The base structure 158 may include a recess 158a. The recess 158a of the base structure 158 may be disposed in a middle part of the base structure 158 and aligned with the shaft structure 151. The base structure 150 of the upper portion 150b may be disposed over the lower portion 150a from which the shaft structure 151 and the guiding elements 152, 153 extend. The upper portion 150b of the obstruction member 150 may further include two obstruction elements 156, 157 spaced apart, extending upward from a same side of the base structure 158. Each of the obstruction elements 156, 157 may include a recess 156a, 157a (FIG. 4A). It should be appreciated that although the obstruction member 150 is shown to include two obstruction elements 156, 157, it shall not be limited by the number of the obstruction elements but instead, the obstruction member 150 may include only one obstruction element or include three or more obstruction elements spaced apart from each other and extending from the base structure 158. In some embodiments, the obstruction member 150 may not include wing structures including the guiding elements 152, 153.

According to various non-limiting embodiments, the support component 180 may include a through-hole 181 extending from a top surface to a bottom surface thereof for receiving the lower portion 150a of the obstruction member 150. The through-hole 181 of the support component 180 may be so configured to conformally receive the shaft structure 151, the wing structures having the guiding elements 152, 153. That is, the lower portion 150a of the obstruction member 150 may be closely received in the through-hole 181 of the support component 180 when assembled. Specifically, the through-hole 181 may include three corresponding cylindrical holes with the middle cylindrical hole receiving the cylindrical shaft structure 151 and two side cylindrical holes respectively receiving the cylindrical guiding elements 152, 153. The through-hole 181 may further include two slots respectively extending from one cylindrical side hole to the middle cylindrical side hole. Accordingly, the through-hole 181 may provide a guide way for the obstruction member 150 when moving from the first position to the second position. The support component 180 may include a protruded guide 184 disposed on the top surface. The protruded guide 184 may be aligned with the middle cylindrical hole of the through-hole 181. When assembled, the recess 158a of the obstruction member 150 may be conformally engaged with the protruded guide 184 of the support component 180 as shown in FIG. 3B. In an embodiment, the recess 158a of the obstruction member 150 may be of a concave shape and the protruded guide 184 of the support component 180 may be U-shaped. The protruded guide 184 of the support component may be provided for a balanced movement of the obstruction member 150 in relative to the support component 180.

In some embodiments, the input device 100 may include two auxiliary buttons 110, 120 and the obstruction member 150 may include two obstruction elements 156, 157. The buttons 110, 120 may each include a button step 111, 121 having a plunger 111b, 121b, as shown in FIGS. 3C and 3D. As shown in FIG. 3C, when the obstruction member 150 is in the first position, the obstruction element 156 may be disposed below the switch 160 and the button 120 (the button step 121) and the obstruction element 157 may be disposed between a further switch and the button 110 (the button step 111). The obstruction elements 156, 157 may be clear from the button steps 121, 111 of the buttons 120, 110, respectively. Hence, the two auxiliary buttons 110, 120 may be depressible such that the plunger 111b, 121b may activate the switch 160 and the further switch respectively. As shown in FIG. 3D, when the obstruction member 150 is in the second position, the obstruction element 156 may be disposed between the switch 160 and the button 120 and the obstruction element 157 may be disposed between a further switch and the button 110. The button steps 121, 111 of the buttons 120, 110 may be disposed in the recesses 156a, 157b of the obstruction elements 156, 157 and thus blocked by the obstruction elements 156, 157, respectively. Specifically, the button step 121 may include a stepped structure 121a. As shown in the enlarged inset 302 of FIG. 3D, the stepped structure 121 may be blocked by the obstruction element 156 when the obstruction member 150 is in the second position, whereas the stepped structure 121 may be disposed above the obstruction element 156 when the obstruction member 150 is in the first position as shown in the enlarged inset 301 of FIG. 3C. Hence, the two auxiliary buttons 110, 120 may be simultaneously disabled by the single obstruction member 150 when in the second position.

In some embodiments, the input device 100 may include one auxiliary button and the input device 100 may include one alternative obstruction member which includes one obstruction element. Accordingly, when the obstruction member is in the second position, the obstruction element may be disposed between the switch 160 and the one auxiliary button. In some embodiments, the input device 100 may include two auxiliary buttons 110, 120 and the input device 100 may include two obstruction members each including only one obstruction element. Accordingly, when one of the two alternative obstruction members is in the second position, the respective obstruction element may be disposed between the corresponding switch and auxiliary button. Hence, the two auxiliary buttons 110, 120 may be individually disabled by one of two obstruction members.

Figure 7B:
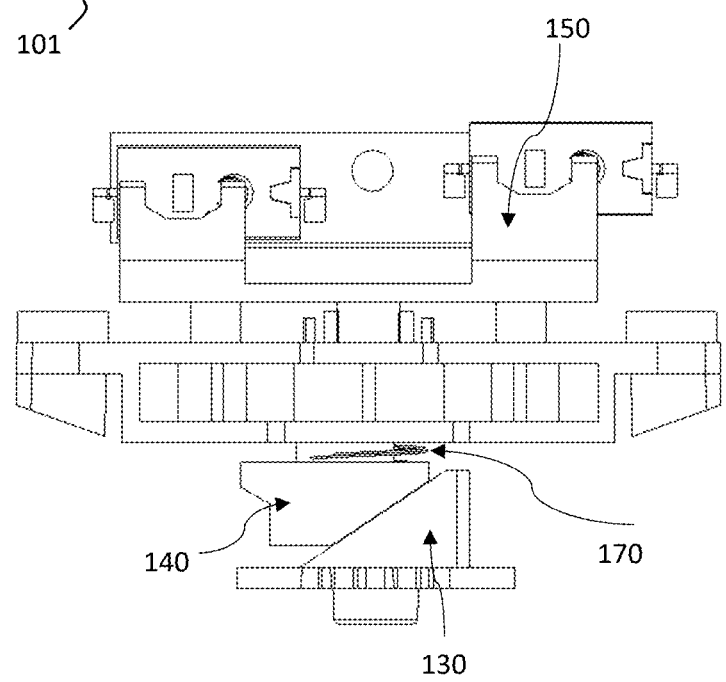
FIG. 7B is a diagram showing a partial front view of the components of the example input device of FIG. 1 when the obstruction member is in the second position.

The description will now move to further describe the operation of the obstruction member 150 with reference to an input device 600 as shown in FIGS. 6A and 6B, the input device 100 as shown in FIGS. 7A and 7B. The alternative obstruction members may be operated in a similar way as the obstruction member 150.

FIG. 6A is a diagram showing a perspective view of the input device 600 with a cross section plane parallel to the YZ plane; FIG. 6B is a diagram showing a cross section view of the input device 600 along the cross section plane as shown in FIG. 6A. FIG. 7A is a diagram showing a partial front view of the input device 100 of FIG. 1 when the obstruction member 150 is in the first position; FIG. 7B is a diagram showing a partial front view of the input device 100 when the obstruction member 150 is in the second position. In FIGS. 7A and 7B, the buttons 110, 120, are omitted so as to show the obstruction member 150 disposed behind the buttons 110, 120.

As shown in FIG. 6B, the input device 600 may include the features of the input device 100 as described above in connection to FIGS. 1 to 5B, and therefore, the common features are labelled with the same reference numerals and need not be discussed. The input device 600 may further include a further button 620, a further selector (not labelled), a further motion changing element (not labelled), a further motion changing arrangement (including the further selector and the further motion changing element), a further obstruction member 650, a further biasing member 670 and a further support component 680. The further obstruction member 650 may include a lower portion (not labelled) and an upper portion 650b. The upper portion 650b of the further obstruction member 650 may include an obstruction element 656. The further obstruction member 650 may include similar structures as the obstruction member 150 but the structures of the further obstruction member 650 may be a mirror image of the structures of the obstruction member 150 about the X-Z plane. The further support component 680 may include similar structures as the support component 180 but the structures of the further support component 680 may be a mirror image of the structures of the support component 180 about the X-Z plane.

According to various non-limiting embodiments, the input device 600 may include a further switch 660 having a further activation element (not labelled). The further button 620 may be disposed relative to the further switch 660. The further button 620 may be depressible from a further undepressed position to a further depressed position to engage the further activation element of the further switch 660 when the obstruction member 650 is in the first position. Accordingly, when the further obstruction member 650 is in the first position, the further button 620 may be depressible to activate the relevant functionality that it is assigned. The further button 620 may be blocked by the obstruction member 650 from being depressible to the further depressed position when the obstruction member 650 is in the second position, wherein the obstruction member 650 (i.e. the obstruction element 656) is between the further switch 660 and the further button 620 when in the second position. Accordingly, when the further obstruction member 650 is in the second position, the further button 620 may be disabled to activate the relevant functionality that it is assigned as the button 620 is blocked by the further obstruction member 650.

FIG. 6B shows that the obstruction members 150 and 650 are in the first position. According to various non-limiting embodiments, when the obstruction member 150 is in the first position, the obstruction member 150 is moved away so as to clear a path for the button 120 such that the plunger 121b of the button 120 may be moved (by pressing the button 120) to activate the switch 160. For example, the obstruction member 150 may be moved below the switch 160 and thus clear the path for the stepped structure 121a of the button 120. Similarly, the further switch 660 may be activated by a plunger of the further button 620 when the further obstruction member 650 is in the first position. When the further obstruction member 650 is in the second position, the further obstruction member 650, particularly, the obstruction element 656 may be positioned directly between the further switch 660 and the further button 620, that is, blocking the path for a stepped structure of the further button 620. Accordingly, the further button 620 may be non-depressible and blocked by the further obstruction member 650. For example, the obstruction element 656 may serve as a spacer directly between a body of the further switch 660 and the further button 620 such that a distance apart between the further switch 660 and the further button 620 may be maintained by the obstruction element 650 and the further button 620 may not be depressed to engage the activation element of the further switch 660. Similarly, when the obstruction member 150 is in the second position, the obstruction member 150, particularly, the obstruction element 156 may be positioned directly between the switch 160 and the button 120, that is, blocking the path for the stepped structure 121a of the button 120. For example, the obstruction element 156 may serve as a spacer directly between a body of the switch 160 and the button 120 such that a distance apart between the switch 160 and the button 120 may be maintained by the obstruction element 156 and the button 120 may not be depressed to engage the activation element of the switch 160.

According to various non-limiting embodiments, and referring to FIGS. 7A and 7B, the input device 100 may further include the biasing member 170, configured to bias the obstruction member 150 to the first position when the obstruction member 150 is at the second position. The biasing member 170 may include a spring. The biasing member 170 may keep the motion changing element 140 in tight engagement with the obstruction member 150 and the selector 130. This may prevent the motion changing element 140 from being floating, moving or causing rattling sound.

Figure 8A:
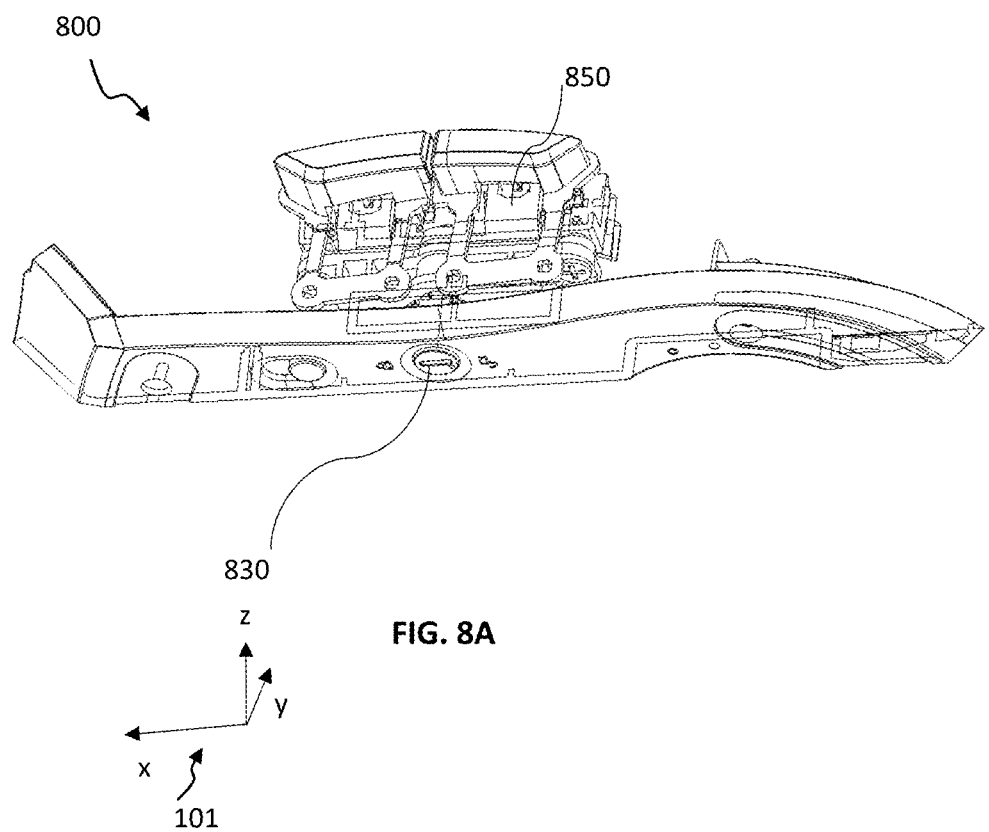
FIG. 8A is a diagram showing a partial perspective view of an example input device according to another embodiment of the present disclosure without part of the housing when the obstruction member is in the first position.
Figure 8B:
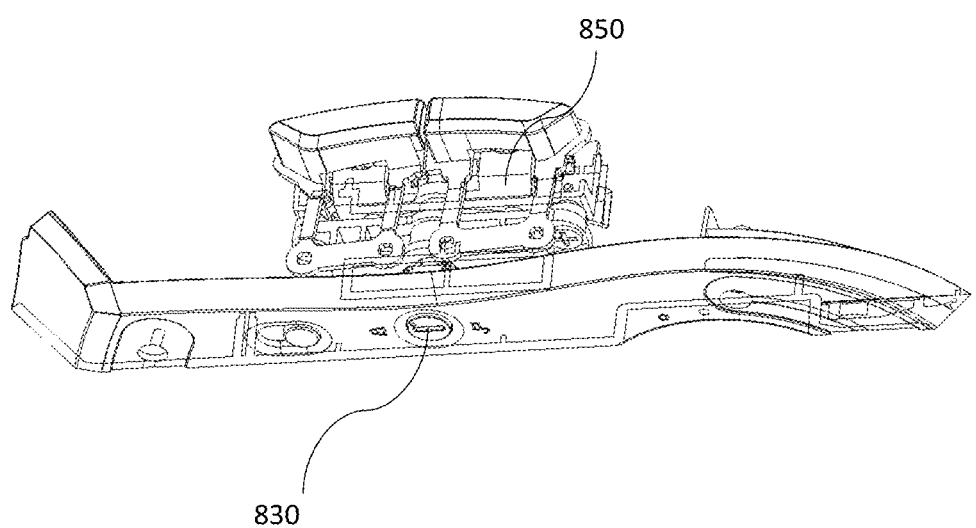
FIG. 8B is a diagram showing a cross section view of the example input device as shown in FIG. 8A.

FIG. 8A is a diagram showing a partial perspective view of an input device 800 according to another embodiment of the present disclosure without part of the housing; FIG. 8B is a diagram showing a cross section view of the input device 800 as shown in FIG. 8A. The input device 800 may include the features of the input devices 100, 600 as described above in connection to FIGS. 1 to 7B, and therefore, the common features are labelled with the same reference numerals and need not be discussed. Part of housing of the input device 800 and the buttons 110, 120 are not shown in FIGS. 8A and 8B.

Figure 9:
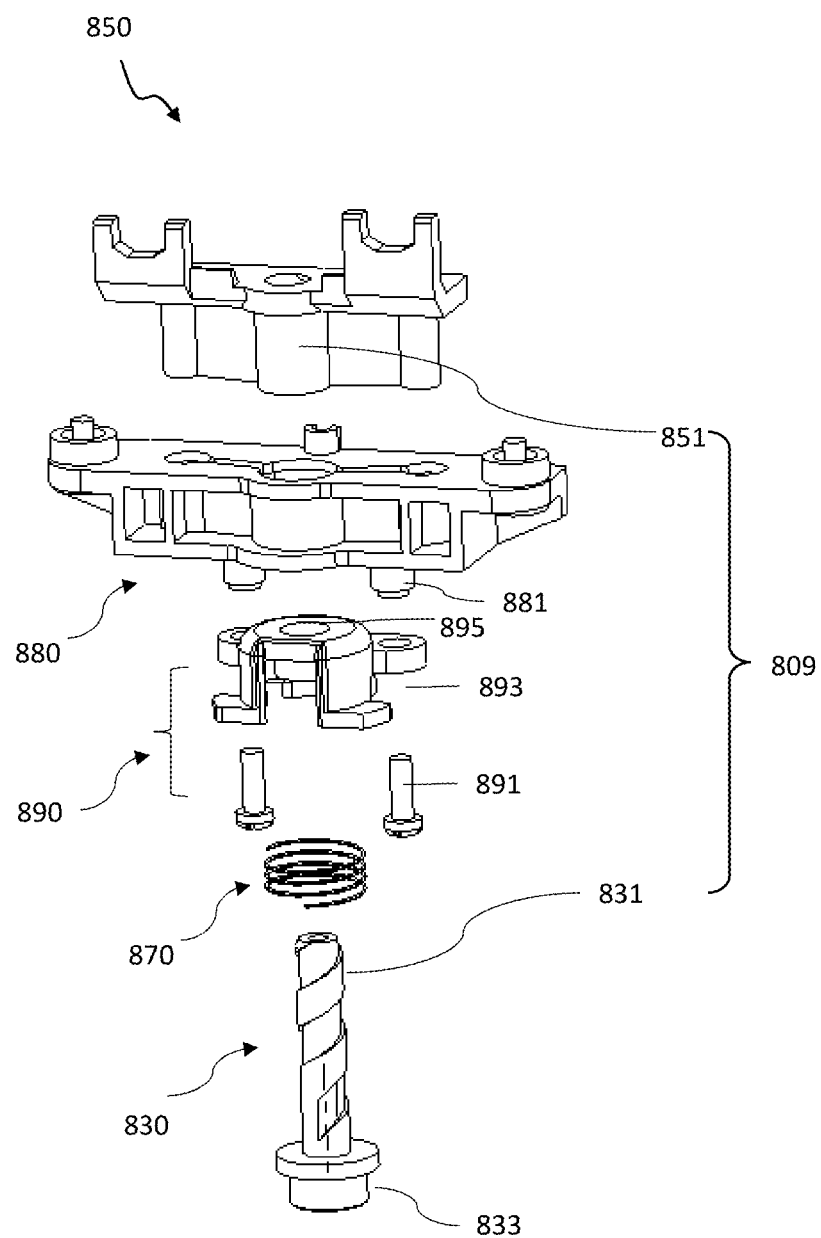
FIG. 9 is a diagram showing an exploded perspective view of the components of the example input device of FIG. 8A.

According to various non-limiting embodiments, the input device 800 may include a selector 830, an obstruction member 850, a motion changing arrangement (for example, 809 as shown in FIG. 9, including an elongate portion 831 of the selector 830 and a through-hole 851 of the obstruction member 850), a biasing member 870, a fastening assembly 890 and a support component 880. The input device 800 may include the button 120 and the switch 160. The button 120 may be disposed in relative to the switch 160. According to various non-limiting embodiments, the motion of the selector 830 and the motion of the obstruction member 850 may be different types of motions. The motion changing arrangement may be a rotary to linear motion converting arrangement (for example, 809 as shown in FIG. 9). For example, the selector 830 may be rotatable along a rotational axis (e.g. in the Z-direction) and the obstruction member 850 may be movable linearly along a movement axis (e.g. in the Z-direction) between the first position and the second position. The rotational axis of the selector 830 and the movement axis of the obstruction member 850 may be parallel to each other.

The description will now describe the selector 830 and the obstruction member 850 with reference to FIGS. 9, FIGS. 10A to 10C. FIG. 9 is a diagram showing an exploded perspective view of the selector 830, the obstruction member 850, the biasing member 870, the fastening assembly 890 and the support component 880 of the input device 800. FIG. 10A is a diagram showing a bottom view of the selector 830, the obstruction member 850, the biasing member 870, the fastening assembly 890 and the support component 880 of the input device 800, assembled; FIG. 10B is a diagram showing a perspective view of the selector 830, the obstruction member 850, the biasing member 870, the fastening assembly 890 and the support component 880 of the input device 800, assembled; FIG. 10C is a diagram showing a front view of the selector 830, the obstruction member 850, the biasing member 870, the fastening assembly 890 and the support component 880 of the input device 800, assembled.

According to various non-limiting embodiments, the selector 830 may include the elongate portion 831 extending from an actuating portion 833 of the selector 830. The obstruction member 850 may include the through-hole 851 where the elongate portion 831 is fitted through. The elongate portion 831 may include external helical or screw threading and the through-hole 851 may include internal screw threading. Accordingly, when the elongate portion 831 of the selector 830 is rotated about the rotational axis relative to the obstruction member 850, the obstruction member 850 may be movable along the elongate portion 831 through the threading engagement therebetween. Hence, a movement of the selector 830 may be transferred from the elongate portion 831 (screw threading) of the selector 830 to the through-hole 851 (screw threading) of the obstruction member 850 for moving the obstruction member 850 in a synchronous manner. According to various embodiments, the elongate portion 831 of the selector 830 and the through-hole 851 of the obstruction member 850 may serve as the rotary to linear motion converting arrangement 809.

According to various non-limiting embodiments, the selector 830 may include the support component 880, the fastening assembly 890 and the biasing member 870. The support component 880 may receive the obstruction member 850 similarly to the support component 180 receiving the obstruction member 150. The support component 880 may include at least one socket structure 881 on a bottom surface thereof. The fastening assembly 890 may include at least one fastening member 891 and a fastening structure 893. The at least one fastening member 891 may be used to secure the fastening structure 893 to the at least one socket structure 881 of the support component 880. The fastening structure 893 of the fastening assembly 890 may include a through-hole 895 such that the elongate portion 831 of the selector 830 may go through the fastening assembly 890, a through-hole of the support component 880, and go into and engage with the through-hole 851 of the obstruction member 850. The biasing member 870 may be disposed around the elongate portion 831 of the selector 830. The biasing member 870 may keep the elongate portion 831 in tight engagement with the obstruction member 850. This may prevent the elongate portion 831 from being floating, moving or causing rattling sound. The biasing member 870 may include a spring.

Figure 11A:
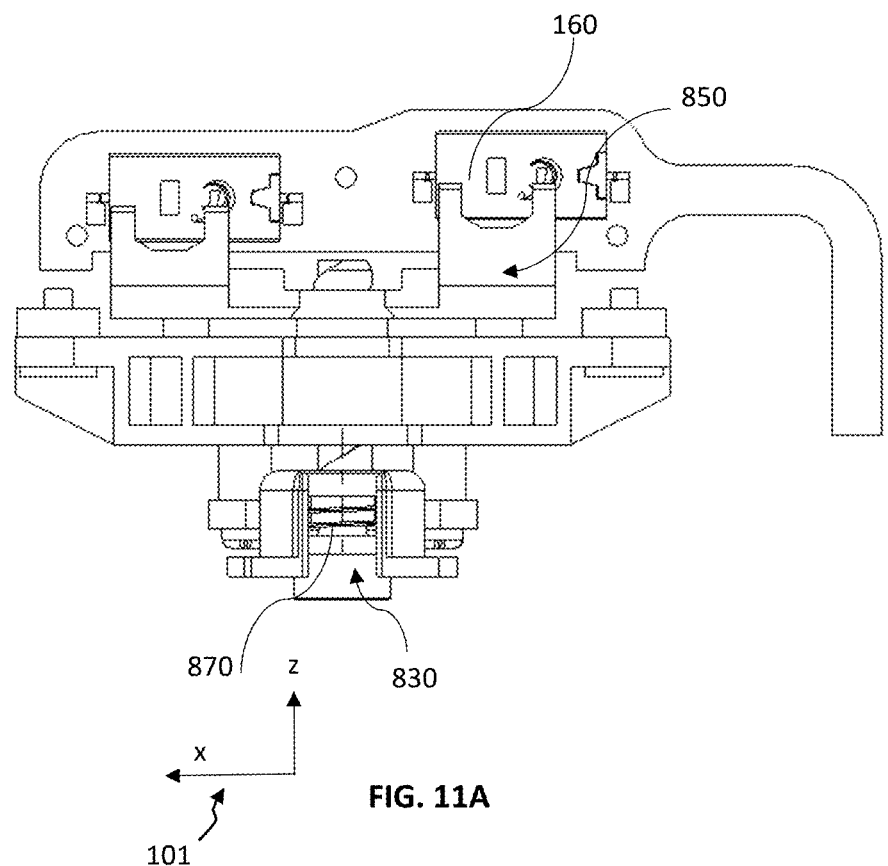
FIG. 11A is a diagram showing a partial front view of the example input device of FIG. 8A when the obstruction member is in the first position.
Figure 11B:
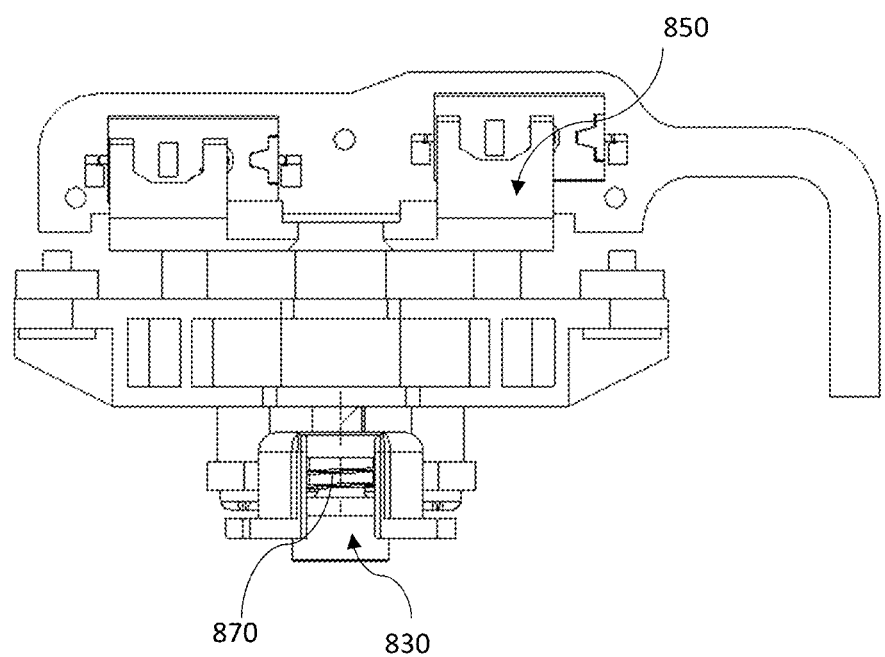
FIG. 11B is a diagram showing a partial front view of the example input device of FIG. 8A when the obstruction member is in the second position.

FIG. 11A is a diagram showing a partial front view of the input device 800 when the obstruction member 850 is in the first position; FIG. 11B is a diagram showing a partial front view of the input device 800 when the obstruction member 850 is in the second position. Part of the housing and the buttons 110, 120 are not shown in FIGS. 11A and 11B.

FIG. 11A depicts that the obstruction member 850 is in the first position and the switch 860 is above the obstruction member 850. FIG. 11B depicts that the obstruction member 850 is in the second position and the switch 860 is between the obstruction member 850 and the button 120 (not shown).

Figure 12:
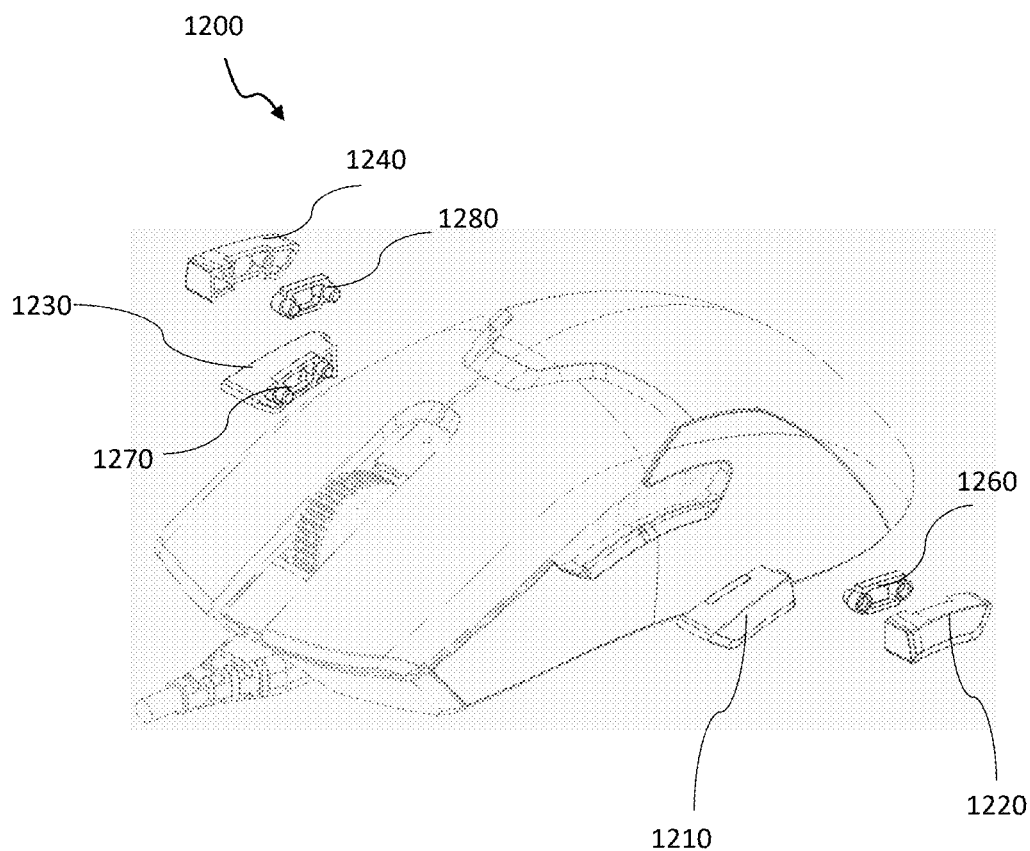
FIG. 12 is a diagram showing a perspective view of an example input device according to another embodiment of the present disclosure.
Figure 13A:
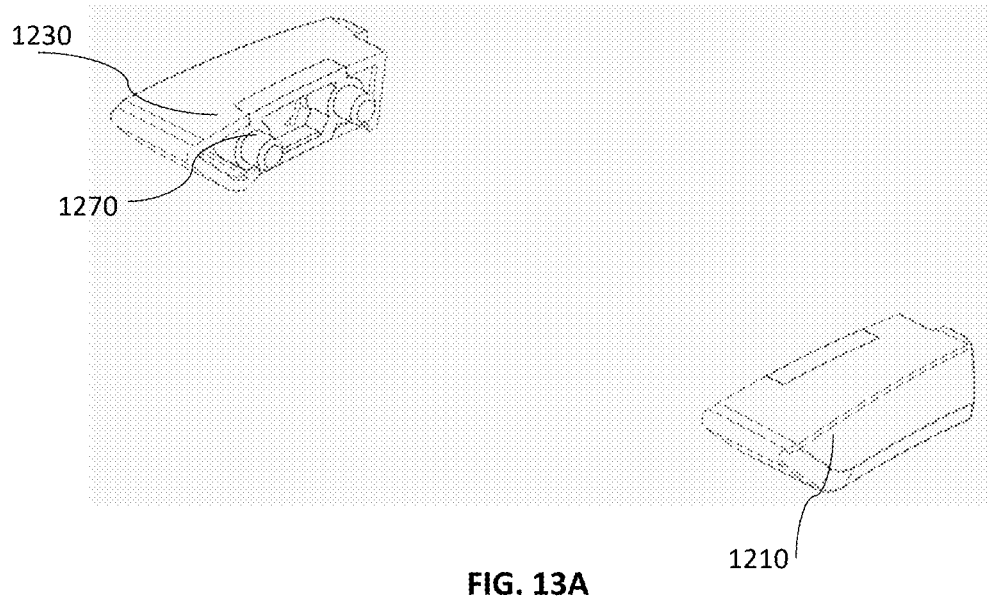
FIGS. 13A and 13B are diagrams showing perspective views of the components of the example input device of FIG. 12.
Figure 13B:
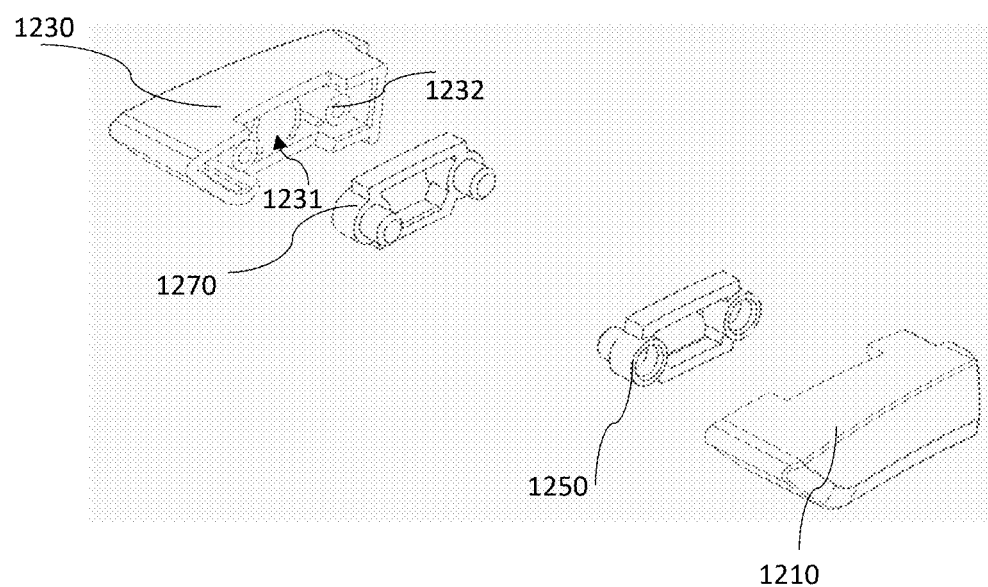

FIG. 12 is a diagram showing a perspective view of an input device 1200 according to another embodiment of the present disclosure. FIGS. 13A and 13B are diagrams showing perspective views of auxiliary buttons of the input device 1200.

According to various non-limiting embodiments, the input device 1200 may include detachable auxiliary buttons 1210, 1220, 1230 and 1240. The auxiliary buttons 1210, 1220, 1230, 1240, are shown detached in FIG. 12. Likely, it shall not be limited to such number and disposition of the auxiliary buttons as shown in FIG. 12 and include any number of auxiliary buttons, including one or three or five and any disposition.

The input device 1200 may further include detachable spacers 1250, 1260, 1270, 1280 (or obstruction members) corresponding to the auxiliary buttons 1210, 1220, 1230, 1240, respectively. A user may choose to attach the spacers to the auxiliary buttons so that the respective auxiliary buttons is blocked by the spacer and consequently disabled as shown in FIG. 13A. On the other hand, the user may choose to detach the spacers from the auxiliary buttons so that the respective auxiliary button is depressible to activate a corresponding switch. The four auxiliary buttons 1250, 1260, 1270, 1280 and the four spacers 1210, 1220, 1230, 1240, may have similar structures. Taking the button 1230 and the corresponding spacer 1270 as an example as shown in FIG. 13B, the button 1230 may include a cavity 1231 and two protrusions 1232 disposed in the cavity 1231 and protruding from opposing ends of the cavity 1231. The spacer 1270 may include two recesses (see spacer 1250 for example) corresponding to the two protrusions 1232 of the button 1230. The spacer 1270 may be coupled to the button 1230 by receiving the protrusions 1232 into the recesses.

Various aspects of what is described here have provided a configurable input device with improved functionalities, thereby augmenting user experience.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i. e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e. g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e. g., an FPGA (field programmable gate array) or an ASIC (application specific integrated circuit). The apparatus can also include, in addition to hardware, code that creates an execution environment for the computer program in question, e. g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e. g., one or more scripts stored in a markup language document), in a single file dedicated to the program, or in multiple coordinated files (e. g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e. g., an FPGA (field programmable gate array) or an ASIC (application specific integrated circuit).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of implementations have been described. Nevertheless, it will be understood that various modifications can be made. Accordingly, other implementations are within the scope of the following claims.

What is claimed is:

1. An input device, comprising:
 a switch having an activation element;
 a button disposed in relative to the switch;
 an obstruction member movable between a first position and a second position, wherein the button is depressible from an undepressed position to a depressed position to engage the activation element of the switch when the obstruction member is in the first position, wherein the button is blocked from being depressible to the depressed position when the obstruction member is in the second position, wherein the obstruction member is between the switch and the button when in the second position;
 a selector operable to cause the obstruction member to move between the first position and the second position; and
 a motion changing arrangement operatively arranged between the selector and the obstruction member to transform a motion of the selector into a motion of the obstruction member for moving the obstruction member between the first position and the second position.

2. The input device of claim 1, wherein the motion of the selector and the motion of the obstruction member are different directions of motions, wherein the motion changing arrangement is a direction-changing arrangement.

3. The input device of claim 2, wherein the selector is slidable along a sliding axis and the obstruction member is movable linearly along a movement axis between the first position and the second position, wherein the sliding axis of the selector and the movement axis of the obstruction member are non-parallel to each other.

4. The input device of claim 3, wherein the motion changing arrangement comprises an engagement portion at the selector in engagement with a corresponding engagement portion at the obstruction member.

5. The input device of claim 4, wherein the engagement portion at the selector comprises an engagement surface inclined with respect to the sliding axis and the corresponding engagement portion at the obstruction member comprises an engagement tip, wherein the engagement tip of the corresponding engagement portion at the obstruction member is in abutment with the engagement surface of the engagement portion at the selector in a manner such that the engagement tip slides along the engagement surface to move the obstruction member along the movement axis when the selector slides along the sliding axis.

6. The input device of claim 5, wherein the engagement tip has a corresponding slanted surface.

7. The input device of claim 5, wherein the corresponding engagement portion at the obstruction member is attached to the obstruction member.

8. The input device of claim 5, wherein the sliding axis of the selector and the movement axis of the obstruction member are perpendicular to each other.

9. The input device of claim 5, wherein the motion changing arrangement comprises a triangular-prism shape structure at the selector with one of the surfaces inclined with respect to the sliding axis to serve as the engagement surface.

10. The input device of claim 1, further comprising:
a guiding member, configured to guide movement of the obstruction member along a movement axis between the first position and the second position.

11. The input device of claim 1, further comprising:
a biasing member, configured to bias the obstruction member.

12. The input device of claim 1, wherein the motion of the selector and the motion of the obstruction member are different types of motions, wherein the motion changing arrangement is a rotary to linear motion converting arrangement.

13. The input device of claim 12, wherein the selector is rotatable along a rotational axis and the obstruction member is movable linearly along a movement axis between the first position and the second position, wherein the rotational axis of the selector and the movement axis of the obstruction member are parallel to each other, and wherein the motion changing arrangement comprises an elongate portion extending from the selector fitted through a through-hole at the obstruction member, wherein the elongate portion comprises external screw threading and the through-hole comprise internal screw threading, wherein the obstruction member is movable along the elongate portion when the elongate portion is rotated about the rotational axis relative to the obstruction member.

14. The input device of claim 1, further comprising:
a further switch having a further activation element; and
a further button disposed in relative to the further switch;
wherein the further button is depressible from a further undepressed position to a further depressed position to engage the further activation element of the further switch when the obstruction member is in the first position, wherein the further button is blocked from being depressible to the further depressed position when the obstruction member is in the second position, wherein the obstruction member is between the further switch and the further button when in the second position.

15. The input device of claim 14, wherein the obstruction member comprises two portions, a first portion being moved to between the switch and the button when in the second position, and a second portion being moved to between the further switch and the further button when in the second position, and wherein the first portion is a mirror image of the second portion.

16. The input device of claim 1, further comprising:
a housing, the housing comprising an aperture, and
wherein the selector is accessible through the aperture of the housing and operable by a user,
wherein the aperture is disposed on a bottom surface of the housing.

17. The input device of claim 16, wherein the housing comprising a further aperture disposed on a side surface of the housing and wherein the button is accessible through the further aperture of the housing and operable by a user.

18. The input device of claim 1, wherein the switch comprises a mechanical-type switch capable of producing an audible click sound or providing a clicking tactile sensation or both upon being actuated.

19. The input device of claim 1, further comprising:
a processor configured to communicate an output signal to a computer based on activation of the switch when the obstruction member is in the first position.

20. The input device of claim 1, further comprising:
a support component disposed between the obstruction member and the selector,
wherein the support component comprises a through-hole for receiving a lower portion of the obstruction member.

* * * * *